United States Patent Office 2,751,364
Patented June 19, 1956

2,751,364

POLYMERS OF UNSATURATED ESTERS OF CYCLOHEXANECARBOXYLIC ACIDS AND COMPOSITIONS CONTAINING THE SAME

Richard R. Whetstone, Orinda, and James R. Scheibli, San Lorenzo, Calif., assignors to Shell Development Company, San Francisco, Calif., a corporation of Delaware No Drawing. Application February 18, 1950, Serial No. 145,092

16 Claims. (Cl. 260—17)

This invention relates to a new class of polymers. More particularly, the invention relates to polymers of unsaturated esters of cyclohexanecarboxylic acids, and to their utilization, particularly as additives for surface coating compositions.

Specifically, the invention provides useful and valuable polymers of esters of saturated aliphatic monocarboxylic acids containing a single ring of six carbon atoms and having one of the said ring carbon atoms joined directly to a carboxyl group, and monohydric alcohols containing an ethylenic linkage at least two carbon atoms removed from the terminal hydroxyl group. The invention further provides compositions, particularly surface coating compositions, containing the above-described polymers.

Organic materials, such as cellulose derivatives and amidealdehyde type resins, have been found to be particularly suited for use in the preparation of surface coating compositions. Solutions of these materials form smooth films which are relatively hard and have good color. Films prepared from these materials are unsatisfactory for many applications, however, as they usually lack gloss, adhesion and flexibility and have poor resistance to outdoor exposure.

In order to improve these properties, it has been necessary to incorporate into the film-forming materials or into appropriate solutions of the said materials additives which tend to add gloss, flexibility, adhesion and durability to the resulting films. The results obtained heretofore have not been too successful. Many of the additives suggested are either incompatible with the film-forming materials, or are insoluble in the solvents used in producing the coating compositions. Other additives, such as non-drying alkyd resins, which have been used to a great extent in industry, impart some adhesion and gloss to the films but fail to give the degree of hardness and resistance to outdoor exposure which is required for many industrial applications. Still other suggested additives are unstable and lack resistance to temperatures encountered in baking, or are too volatile and easily lost from the composition after it has been exposed to air and heat for extended periods of time.

It is an object of the invention, therefore, to provide a new class of additives for film-forming materials. It is a further object to provide additives for film-forming materials which impart to the resulting films a high degree of gloss and adhesion, and improved durability. It is a further object to provide coating compositions comprising amide-aldehyde type resins which have many improved physical properties. It is a further object to provide cellulose derivative compositions having improved hardness and superior resistance to outdoor exposure. It is a further object to provide a new class of polymers. It is still a further object to provide polymers of unsaturated esters of cyclohexanecarboxylic acids which have many unique properties which enable them to be used for many important industrial applications. Other objects and advantages of the invention will be apparent from the following detailed description thereof.

It has now been discovered that these and other objects may be accomplished by the polymers of esters of saturated aliphatic monocarboxylic acids containing a single ring of six carbon atoms and having one of the said ring carbon atoms joined to a carboxyl group, and monohydric alcohols containing an ethylenic linkage at least two carbon atoms removed from the terminal hydroxyl group. These polymers have been found to be superior additives for film-forming materials, particularly the amide-aldehyde type resins and the cellulose derivatives. The polymers are highly compatible with these materials and when used, even in relatively small quantities, endow the said materials with greatly improved physical properties. Films containing these polymers have good gloss and excellent strength and flexibility. In addition, films containing the polymers are much harder than those containing the prior known resin additives, and have far superior resistance to outdoor exposure. Evidence of this superiority is shown in the examples cited hereinafter.

The esters used in producing the novel polymers of the invention are the unsaturated esters of saturated aliphatic monocarboxylic acids containing a single ring of six carbon atoms and having one of the said ring carbon atoms joined directly to a carboxyl group. These acids are referred to generically throughout the specification and claims as "cyclohexanecarboxylic acids." Illustrative examples of these acids are cyclohexanecarboxylic acid, 2 - methylcyclohexanecarboxylic acid, 2,3,5 - trimethylcyclohexanecarboxylic acid, 2-chlorocyclohexanecarboxylic acid, 2-butylcyclohexanecarboxylic acid, 4-nitrocyclohexanecarboxylic acid, 2,4-dibromocyclohexanecarboxylic acid, and 3-ethyl-4-bromocyclohexanecarboxylic acid.

Preferred acids are those containing a ring of six carbon atoms wherein one of the ring carbon atoms is joined to a hydrogen atom and to the carboxyl group, and the remaining ring carbon atoms are joined to substituents selected from the group consisting of hydrogen, chlorine, bromine, and straight chain alkyl radicals containing from 1 to 5 carbon atoms. Examples of these acids are cyclohexanecarboxylic acid, 2,3,5-trimethylcyclohexanecarboxylic acid, 2,4-dichloro-5-methylcyclohexanecarboxylic acid, 2,2-dimethylcyclohexanecarboxylic acid, 2,4,5-trimethylcyclohexanecarboxylic acid, 3-butyl-4-chlorocyclohexanecarboxylic acid, 2-ethyl-4-butylcyclohexanecarboxylic acid, and 2,4-dibromocyclohexanecarboxylic acid.

The alcohols used in esterifying the above-described acids are the monohydric alcohols containing an ethylenic linkage at least two carbon atoms removed from the terminal hydroxyl group. The alcohols may be substituted with aliphatic, alicyclic, aromatic or heterocyclic radicals which may be further substituted with halogen atoms, ether, ester, and the like radicals. Examples of such alcohols are allyl alcohol, methallyl alcohol, chloroallyl alcohol, ethallyl alcohol, 3-cyclohexyl-2-propen-1-ol, 2-isopropyl-2-propen-1-ol, 3-benzyl-2-propen-1-ol, 3-penten-1-ol, 4-phenyl-2-hexen-1-ol, 3-acetoxy-2-buten-1-ol, 4-bromo-3-hexen-1-ol, 2,4-dichloro-3-hepten-1-ol, 3-butyl-2,5-hexadien-1-ol, 3,6-diethyl-2,4-octadien-1-ol, and 4-chloro-2-hexen-1-ol.

Preferred unsaturated alcohols are the beta,gamma-ethylenically unsaturated monohydric alcohols, preferably containing from 3 to 18 carbon atoms. These alcohols are sometimes referred to as "allyl-type" alcohols. Examples of these alcohols are allyl alcohol, ethallyl alcohol, chloroallyl alcohol, 2-isopropyl-2-propen-1-ol, 4-chloro-2-hexen-1-ol, 5-ethyl-2-hexen-1-ol, 3-acetoxy-2-buten-1-ol, 4-bromo-2-hexen-1-ol, and 3-nitro-2-hepten-1-ol. Particularly preferred alcohols are the beta,gamma-monoethylenically unsaturated aliphatic monohydric alcohols containing from 3 to 15 carbon atoms. Still further preferred are the 2-alkenols containing from 3 to 10 carbon atoms.

The unsaturated esters are obtained by esterifying one of the above-described acids with any one of the above-described alcohols. Examples of such esters are allyl cyclohexanecarboxylate, methallyl 2-methylcyclohexanecarboxylate, chloroallyl trimethylcyclohexanecarboxylate, 3-butenyl cyclohexanecarboxylate, 3-cyclohexyl-2-propenyl 3-chlorocyclohexanecarboxylate, allyl 3-butyl-4-chlorocyclohexanecarboxylate, 3-hexenyl 2,4-dibromocyclohexanecarboxylate, allyl triethylcyclohexanecarboxylate, 3-benzyl-2-propenyl cyclohexanecarboxylate, and chloroallyl 2-butylcyclohexanecarboxylate.

The preferred esters, i. e., those prepared from the preferred acids and preferred alcohols are exemplified by allyl cyclohexanecarboxylate, methallyl 2-methylcyclohexanecarboxylate, chloroallyl trimethylcyclohexanecarboxylate, 2-butenyl trichlorocyclohexanecarboxylate, 2-hexenyl 3-butylcyclohexanecarboxylate, and ethallyl 3,5-dichlorocyclohexanecarboxylate.

The above-described esters may be prepared by any suitable method. They may be prepared by direct esterification of the above-described acids and alcohols, by reacting the alcohols with an acid chloride in pyridine, or by an ester-exchange reaction.

The esters are preferably prepared by reacting the acid and alcohol together in the presence of an esterification catalyst and removing the water formed during the reaction, preferably by distillation. Catalysts utilized in this reaction may be exemplified by p-toluenesulfonic acid, ethylsulfonic acid, benzenesulfonic acid, hydrobromic acid, chloroacetic acid, sulfuric acid, formic acid, boron and silicon fluorides, acide salts, such as monosodium sulfate, and the salts of strong acids and weak bases, such as zinc chloride, and zinc sulfate, and the like. The amount of the catalyst employed will vary over a wide range depending upon the particular type of reactants, type of catalyst selected, and reaction conditions employed. In most cases, the amount of the catalyst will vary from 0.1% to 5% by weight of the reactants.

The esterification may be accomplished in the presence or absence of solvents or diluents. In case solvents or diluents are employed, organic compounds, such as benzene, toluene, cyclohexane, xylene, and mixtures thereof, which do not interfere with the reaction, are generally preferred.

It is also sometimes preferred to accomplish the esterification in the presence of a polymerization inhibitor, such as copper bronze powder, sulfur, p-phenylenediamine, hydroquinone, tannic acid and various amino and sulfur compounds. These inhibitors may be subsequently removed by washing, distillation, extraction, and the like.

The temperature employed in the esterfication process may vary over a considerable range. In general, temperatures varying between about 50° C. to 150° C. may be utilized. Preferred temperatures range from about 80° C. to 125° C. Atmospheric, superatmospheric, or subatmospheric pressures may be employed as desired or necessary.

The esters may be recovered from the reaction mixture by any suitable means, such as extraction, distillation, fractional precipitation, and the like.

The novel polymers of the invention are prepared by polymerizing any one of the above-described esters, a mixture of two or more of such esters, or by copolymerizing one or more of the said esters with other types of single unit monomers containing at least one $CH_2=C=$ group in their molecule. The expression "single unit monomer" is used in the specification and appended claims to distinguish the copolymerizable material from polymeric or resinous material that contain a plurality of recurring units of the same or different monomers. If the finished polymers are to be used as additives for the production of superior surface coating compositions as described hereinbelow, the amount of the single unit monomer or monomers used in the production of the said polymers should preferably be maintained in minor quantities compared with the amount of the above-described esters, i. e., 40% or less, and particularly between .5% and 30% of the total monomers being polymerized.

Monomers that may be copolymerized with the above-described esters may be exemplified by styrene, alpha-methylstyrene, dichlorostyrene, vinyl naphthalene, vinyl phenol, acrylic acid and the alpha-alkyl substituted acrylic acids; the esters of these unsaturated acids, such as methyl acrylate, methyl methacrylate, butyl methacrylate, and propyl acrylate; the vinylidene halides, such as vinylidene chloride, vinylidene bromide and vinylidene fluoride; the vinyl esters of the inorganic acids, such as the halogen acids and hydrocyanic acid, such as vinyl chloride, vinyl bromide, acrylonitrile, and methacrylonitrile; the vinyl esters of the monocarboxylic acids, such as vinyl acetate, vinyl chloroacetate, vinyl benzoate, allyl propionate, vinyl caproate; the vinyl esters of the polycarboxylic acids, such as divinyl succinate, divinyl adipate, vinyl allyl phthalate, vinyl methallyl pimelate, diallyl phthalate, and vinyl methyl glutarate; the vinyl esters of the unsaturated acids, such as vinyl acrylate, vinyl crotonate, and vinyl methacrylate; the vinyl ethers, such as vinyl ethyl ether, vinyl butyl ether; and the vinyl ketones, such as vinyl butyl ketone, and the like.

The polymerization may be accomplished by any suitable method. It is preferably accomplished by heating the desired monomer or monomers in the presence of a polymerization catalyst. This polymerization may be effected in the presence of the monomer or monomers themselves, in the presence of solvents, or in an aqueous emulsion or suspension.

Catalysts that may be used in the polymerization may be exemplified by benzoyl peroxide, lauroyl peroxide, benzoyl peroxide, tertiary butyl hydroperoxide, 2,2-di(tertiary butyl peroxy) butane, di(tertiary butyl) peroxide, di(tertiary amyl) peroxide, tertiary butyl perbenzoate, cumene hydroperoxide, tertiary butyl peracetate, tertiary butyl pelargonate, and the like, and mixtures thereof. The amount of the catalyst added may vary over a considerable range. In general, the amount of the catalyst added will vary from 0.1% to 5% by weight of the material being polymerized. Preferred amounts vary from 1% to 2% by weight. If desired, air may be dispersed through the reaction mixture to act as a catalyst in effecting the polymerization.

The temperature employed in the polymerization may vary over a considerable range depending upon the material being polymerized, catalyst selected, etc. In most cases, the temperature employed will vary from 65° C. to about 300° C. Preferred temperatures range from 100° C. to 250° C. Atmospheric, superatmospheric or subatmospheric pressures may be used. In most cases, where the operating temperature is above the boiling point of the polymerization mixture, it is desirable to use superatmospheric pressures at least equal to the autogenic pressure.

As indicated above, the novel polymers of the invention are particularly suited for use as components for surface coating compositions. The polymers are highly compatible with the film forming materials, such as the amide-aldehyde type resins, cellulose derivatives, vinyl-type polymers, and natural drying oils, and in combination therewith form surface coatings having many superior properties. The expression "amide-aldehyde type resin" is used throughout the specification and claims to refer in a generic sense to the resinous products obtained by condensing aldehydes with amides. Such resins are sometimes referred to as "aminoplasts." Aldehydes used in producing this type of resin may be exemplified by formaldehyde or compounds engendering formaldehyde (e. g. paraformaldehyde, hexamethylene tetramine, etc.), acetaldehyde, propionaldehyde, butyraldehyde, acrolein, methacrolein, crotonaldehyde, benzaldehyde, furfural, etc., mixtures thereof, or mixtures of formaldehyde or materials yielding formaldehyde with such aldehydes. The amides used in producing the said resins may be exemplified by urea, thiourea, diurea, hydroxyurea, ethanolurea, unsymmetrical diphenylurea, diethylene triurea, methylurea, acetylurea, phenylthiourea, asymmetrical diethylurea, methylolureas, methyleneureas, guanidine, dicyandiamide, guanyl urea, guanyl thiourea, melamine, and the like.

The vinyl-type polymers that may be combined with the novel polymers in producing the improved surface coating compositions comprise the homopolymers, copolymers and interpolymers of the vinyl-type monomers. Vinyl-type monomers include those organic compounds containing at least one $CH_2=C=$ group in their molecule. Examples of the vinyl-type monomers are styrene, alpha-methylstyrene, dichlorostyrene, vinyl naphthalene, vinyl phenol, acrylic acid and the alpha-alkyl substituted acrylic acids; the esters of these unsaturated acids, such as methyl acrylate, methyl methacrylate, butyl methacrylate, and propyl acrylate; the vinylidene halides, such as vinylidene chloride, vinylidene bromide and vinylidene fluoride; the vinyl esters of the inorganic acids, such as the halogen acids and hydrocyanic acid, as vinyl chloride, vinyl bromide, acrylonitrile, and methacrylonitrile, the vinyl esters of the monocarboxylic acids such as vinyl acetate, vinyl chloroacetate, vinyl benzoate, vinyl valerate, and vinyl caproate; the vinyl esters of the polycarboxylic acids, such as divinyl succinate, divinyl adipate, vinyl allyl phthalate, vinyl methyl glutarate; the vinyl esters of the unsaturated acids, such as vinyl acrylate, vinyl crotonate, and vinyl methacrylate.

Preferred vinyl-type polymers to be combined with the novel polymers are the vinyl halide polymers. The expression "vinyl halide polymer" is used throughout the specification and claims to refer to polymers containing a predominant quantity, i. e., at least 60% by weight of a vinyl halide, such as vinyl chloride and vinyl bromide. Examples of these polymers are poly(vinyl chloride), copolymers of vinyl chloride and vinyl acetate, copolymers of vinyl chloride and vinylidene chloride, and copolymers of vinyl chloride and diethyl fumarate.

The novel polymers are especially valuable as additives for coating compositions containing the cellulose derivatives. Such derivatives may be exemplified by cellulose nitrate, cellulose acetate, cellulose acetate butyrate, cellulose propionate, cellulose isobutyrate, cellulose crotonate, cellulose stearate and cellulose valerate; ethyl cellulose, methyl cellulose, butyl cellulose, benzyl cellulose, glycol cellulose, cellulose acetostearate, cellulose acetopropionate, cellulose acetotartarate, and the like, and mixtures thereof.

The preferred cellulose derivative to be used with the novel polymers is nitrocellulose. Various grades of nitrocellulose may be employed. Ordinarily, R. S. ½ sec. nitrocellulose may be used, although lower viscosity grades like R. S. ¼ sec. or higher viscosity grades like R. S. 6 sec. may be employed if desired. The established standard of viscosity grades for nitrocellulose is explained in ASTM test D301–33.

A single polymer of the invention may be added to the above-described film-forming materials or solutions thereof, or a mixture of two or more of the said polymers may be utilized. The amount of the polymer or polymers to be added will vary over a considerable range depending upon the type of film-forming material, intended use of the finished product, etc. In general, 1 part to 300 parts of polymer will be used for every 100 parts of film-forming material. Ordinarily, in the production of coating compositions, such as lacquers, the amount of polymer will vary from 25 parts to 150 parts per 100 parts of film-forming material.

In the preparation of coating compositions, the polymer and film-forming material are combined together in a liquid vehicle which is usually employed in the preparation of such coatings, such as solvents as ethyl acetate, isopropyl acetate, n-butyl acetate, methyl ethyl ketone, methyl isobutyl ketone, acetone, ethylene glycol ethyl ether, toluene, xylene, ethyl alcohol, isopropyl alcohol, n-butyl alcohol, methyl isobutyl alcohol, various petroleum fractions, and the like, and mixtures thereof. The amount of the vehicle employed will vary over a wide range depending chiefly upon the viscosity desired in the finished solution. In general, amounts of vehicle varying from 5% to 95% of the total coating composition are usually satisfactory.

Other materials, such as plasticizers like dibutyl phthalate, dioctyl phthalate, tricresyl phosphate, and the like, as well as additives, such as kopal, kauri, damar, ester gums, and the like, may also be added. If colored compositions are desired, pigments and coloring materials, such as titanium pigments, may be incorporated in appropriate amounts.

The coating compositions of the present invention are superior to many of the coatings now available in industry. The compositions form clear finishes having excellent hardness, good gloss and superior resistance to water and alkalies and outdoor exposure. Coating compositions in appropriate solvents may be applied to substantially any surface, such as steel or metal, either primed or unprimed, by spraying, brushing or other methods. The solvents may be evaporated at room temperature but in many cases it is preferred to bake the coatings by application of infra-red rays or in a suitable oven. In the latter case, very high temperatures may be used without discoloring or causing decomposition of the coating.

The coating compositions of the invention may also be used to impregnate fabrics and fibrous materials to impart rigidity thereto or to laminate wood or fabrics of cotton or glass fibers. It is also feasible to introduce the compositions into or to apply them to fibers, such as wood flour, employed in the preparation of molding powders.

The polymers of the invention may also be used for a great variety of other applications. They may be used, for example, in the production of rigid plastic articles, as plasticizers for various natural and synthetic resins, as textile assistants, and as components for lubricating and impregnating compositions.

To illustrate the manner in which the invention may be carried out the following examples are given. It is to be understood, however, that the examples are for the purpose of illustration and the invention is not to be regarded as limited to any of the specific conditions cited therein. Unless otherwise specified parts disclosed in the following examples are parts by weight.

*Example I*

About 993 parts of cyclohexanecarboxylic acid was mixed with 592 parts of allyl alcohol, 150 parts of toluene and 3 parts of p-toluenesulfonic acid and the resulting mixture heated under reflux. The water formed in the reaction was removed as an azeotrope with the benzene. When the reaction was complete the catalyst was removed with an acid exchange resin and the resulting mixture distilled to produce allyl cyclohexanecarboxylate, a colorless liquid having a B. P. of 95.7° C. (16 mm.), an ester value of .59 eq./100 g., a bromine No. of 95 g. Br/100 g., and $n$ 20/D 1.4575.

The allyl cyclohexane carboxylate was mixed with 2 parts of ditertiary butyl peroxide and the mixture heated at 130° C. for a short period. At the end of the heating period the unreacted monomer and catalyst decomposition product were removed by distillation. The resulting product was a soft colorless solid polymer having an ester value of .58 eq./100 g., and a bromine No. of 5 g. Br/100 g. The polymer was soluble in acetone, benzene and organic esters and was highly compatible with nitrocellulose.

*Example II*

About 987 parts of methylcyclohexanecarboxylic acid was mixed with 522 parts of allyl alcohol, 150 parts of toluene and 3 parts of p-toluenesulfonic acid and the resulting mixture heated under reflux, the water formed in the reaction being removed as an azeotrope. After the reaction was complete, the mixture was distilled to produce allyl methylcyclohexane carboxylate, a colorless, mobile liquid having the following physical properties: B. P. 118° to 120° C. at 20 mm. Hg., Sp. Gr. 20/4 .9515; RI 20/D 1.457(4); acidity less than 0.001 eq./100 g., ester value 0.552 eq./100 g.

The allyl methylcyclohexanecarboxylate was then mixed with 2 parts of ditertiary butyl peroxide and heated at 115° C. to 130° C. for several hours. At the end of the heating period the mixture was distilled to remove the unreacted monomer and catalyst decomposition products. The resulting product was a soft, light amber, solid polymer, which was soluble in acetone, benzene and organic esters, and compatible with the cellulose derivatives.

*Example III*

About 850 parts of trimethylcyclohexanecarboxylic acid was mixed with 386 parts of allyl alcohol, 125 parts of toluene and 3 parts of p-toluenesulfonic acid and the resulting mixture heated under reflux while the theoretical amount of water was collected as an azeotrope. When the reaction was complete the mixture was distilled to produce allyl trimethylcyclohexanecarboxylate, a colorless mobile liquid.

The allyl trimethylcyclohexanecarboxylate was then polymerized by heating at 115° C. to 130° C. in the presence of 2 parts of ditert-butyl peroxide. The unreacted monomer and catalyst decomposition products were removed at the completion of the reaction as shown in Example II. The resulting product was a soft, colorless, solid polymer which was highly compatible with nitrocellulose.

*Example IV*

About 990 parts of cyclohexanecarboxylic acid is mixed with 600 parts of methallyl alcohol, 150 parts of toluene and 3.5 parts of p-toluenesulfonic acid and the resulting mixture heated under reflux as shown in Example I. When the esterification is substantially complete the reaction mixture is distilled to produce methallyl cyclohexanecarboxylate, a colorless, mobile liquid.

The methallyl cyclohexanecarboxylate is then heated at 120° C. to 130° C. in the presence of 2 parts of ditert-butyl peroxide. The unreacted monomer is removed by distillation as shown in Example II. The resulting product is a soft, colorless solid.

*Example V*

About 995 parts of 3-chlorocyclohexanecarboxylic acid is mixed with 580 parts of 2-pentenol, 150 parts of toluene and 3.5 parts of p-toluenesulfonic acid and the resulting mixture heated under reflux as shown in Example I. When the esterification is substantially complete the reaction mixture is distilled to produce 2-pentenyl 3-chlorocyclohexanecarboxylate.

The 2-pentenyl 3-chlorocyclohexanecarboxylate is then polymerized by heating at 115° C.–130° C. in the presence of 3 parts of ditert-butyl peroxide, to form a soft, solid polymer.

*Example VI*

About 95 parts of allyl cyclohexanecarboxylate produced in Example I was mixed with 5 parts of diallyl phthalate and 2 parts of ditertiary amyl peroxide and the resulting mixture heated at 130° C. for several hours. The mixture was then distilled at 150° C. under a pressure of 3 mm. in a slow stream of carbon dioxide to remove the unreacted monomer. The resulting product was a colorless, soft solid which was readily soluble in acetone and benzene.

*Example VII*

About 90 parts of allyl cyclohexanecarboxylate was mixed with 10 parts of styrene and 1 part of ditert-butyl peroxide and heated at 120° C. for 24 hours. The unreacted monomer was removed by distillation as shown in the preceding example. The resulting product was a light colored polymer having a slight tackiness.

Copolymers having similar properties were obtained by repeating this experiment and replacing the styrene with 10 parts of vinyl acetate and 10 parts of methyl methacrylate.

*Example VIII*

About 60 parts of allyl trimethylcyclohexanecarboxylate produced in Example III is mixed with 40 parts of allyl propionate and 2 parts of ditert-butyl peroxide and the resulting mixture heated at 130° C. for several hours. The unreacted monomer was then removed by distillation as shown in Example VI. The resulting product is a colorless, solid copolymer which is soluble in various organic solvents.

Other copolymers are prepared by repating this experiment and replacing the allyl propionate with 40 parts of methacrylonitrile and 40 parts of acrylonitrile.

*Example IX*

A coating composition was prepared by mixing 1 part of nitrocellulose, 1 part of poly(allyl cyclohexanecarboxylate) and 0.2 part of dibutyl phthalate with a solvent comprising 19% v. n-butylacetate, 19% ethyl acetate, 12% v. n-butanol, 30% v. toluene and 20% v. petroleum lacquer solvent, to form a solution having about 30% solids. Films of this solution were cast on steel panels and dried at 80° C. for 2 hrs. and then allowed to stand at room temperature for several days. At the end of this period the films were very hard and flexible and had excellent resistance to water and outdoor exposure.

*Example X*

The superior hardness of the nitrocellulose films containing novel polymers of the invention is shown in the following tests. Lacquers were prepared containing one part of each of the resins shown in the table per part of R. S. ½ sec. nitrocellulose in a solvent consisting of 56% n-butyl acetate, 4% ethyl alcohol and 40% xylene. Films of these lacquers were cast on glass panels, forced dried two hours at 80° C. and then allowed to stand at room temperature. The films were then tested for hardness. The results are indicated in the table below:

| Resin Constituent with nitrocellulose | Sward Hardness seven days after casting |
| --- | --- |
| Commercial non-drying alkyd (Rezyl 99) | 55 |
| Poly(allyl propionate) | 40 |
| Poly(allyl cyclohexanecarboxylate) | 76 |
| Poly(allyl methylcylcohexanecarboxylate) | 76 |

*Example XI*

The excellent water resistance of the nitrocellulose films containing the novel polymers of the invention is shown in the following tests. Lacquers were prepared containing one part of resin shown in the table below per part of R. S. ½ sec. nitrocellulose in a solvent consisting of 56% n-butyl acetate, 4% ethyl alcohol and 40% xylene. The solids content of the lacquers was approximately 15%. These lacquers were sprayed on steel panels using successive coatings until the dried film had a thickness of one mil. The coated panels were dried at room temperature and humidity for 11 days and then placed in distilled water according to the procedure shown in ASTM ES-35. The panels were inspected at the end of 168 or 169 hrs. The results are indicated in the following table:

| Resin Constituent with nitrocellulose | Test Period, hours | Condition of Film at end of Test | Appearance after 24 hrs. recovery |
|---|---|---|---|
| Commercial non-drying alkyd (Rezyl 99). | 168 | Slight whitening. | Still slight whitening. |
| Poly(allyl benzoate) | 169 | ___do___ | Do. |
| Poly(allyl cyclohexanecarboxylate). | 168 | No whitening. | No whitening. |
| Poly(allyl methylcyclohexane carboxylate). | 169 | ___do___ | Do. |

*Example XIII*

The superior resistance of the nitrocellulose films containing the novel polymers of the invention to outdoor exposure is shown in the following tests. Lacquers were prepared containing one part of resin shown in the table below per part of R. S. ½ sec. nitrocellulose and 0.2 part of dibutyl phthalate as plasticizer in a solvent mixture consisting of 44% toluene, 42.7% methyl isobutyl ketone and 13.3% ethyl alcohol. The solids content of the lacquers and the viscosity thereof are given in the table below. These lacquers were sprayed on steel panels previously coated with red oxide primer using successive coatings until the dried film had a thickness of one mil. The coated panels were then exposed to the atmosphere at a 45° C. angle facing south. After exposure for the time indicated in the table, the panels were compared for rating with the photographic standards of ASTM tests on blistering (D714–45) and flaking (D772–47). For the blister rating, the scale ranges from No. 10 indicating no blistering down to No. 0 which represents very large size blisters. The percentage of surface covered with the blister is also indicated. Likewise, the flaking standards range from No. 10 for no flaking down to No. 0 for very severe flaking. In other words, the employed standard scales are such that the smaller the scale number the greater the deterioration. Moreover, the extent of difference between scale numbers advances sharply. Thus, pinpoint blisters are rated as No. 8, and No. 6 blisters are about $\frac{1}{15}$ inch diameter. The results of the exposure test are indicated in the following table:

| Resin Constituent with nitrocellulose | Percent solids in lacquer | Viscosity, Secs. (No. 4 Ford Cup) | Blister rating after 7 mo. | Flaking rating after 7 mo. |
|---|---|---|---|---|
| Commercial non-drying alkyd (Rezyl 99). | 17.6 | 21.4 | 8 to 3 (95% surf.). | No. 2. |
| Poly(allyl benzoate). | 20 | 20.7 | + | No. 1. |
| Poly(allyl cyclohexanecarboxylate). | 20 | 20.2 | No. 10 (100% surf.). | No. 10 (100% surf.). |

+ = Complete failure after 6 months.

The exposure of the films containing the poly(allyl cyclohexanecarboxylate) was continued for a total of 24 months. At the end of that period, the film had just begun to show slight failure and by microscopic examination was given a blister rating of No. 8.

*Example XIV*

A coating composition is prepared by mixing 1 part of ethyl cellulose with 1 part of poly(allyl trimethylcyclohexanecarboxylate) and 0.4 part of dibutyl phthalate in a solvent comprising equal volumes of xylene and n-butanol. Films of this solution dried on steel panels have good hardness, flexibility and improved resistance to water.

*Example XV*

A coating composition is prepared by mixing 1 part of a melamine-formaldehyde resin (Melmac 245–8) with 1 part of poly(allyl cyclohexanecarboxylate) in a solvent comprising 45% xylene and 55% n-butanol so as to form a solution having about 30% solids. Films of this solution cast on tin panels and baked at 150° C. for 30 minutes have good hardness and flexibility.

*Example XVI*

A coating composition is prepared by mixing 1 part of an urea-formaldehyde resin (Beetle 227–8) with 1 part of poly(allyl methylcyclohexanecarboxylate) in a solvent comprising 45% xylene and 55% n-butanol so as to form a solution having about 30% solids. Films of this solution cast on tin panels and baked at 150° C. for 30 minutes are hard and flexible and have good resistance to water.

*Example XVII*

A composition was prepared by mixing 80 parts of poly(allyl cyclohexanecarboxylate) with 100 parts of poly(vinyl chloride) and milling the resulting mixture at 150° C. for 3 minutes. The resulting sheet had good hardness and improved resistance to outdoor exposure.

*Example XVIII*

A coating composition was prepared by mixing 1 part of nitrocellulose, 1 part of the copolymer of allyl cyclohexanecarboxylate and styrene prepared in Example VII with a solvent shown in Example IX. Films of this solution were cast on steel panels and dried at 80° C. for 2 hours and then allowed to stand at room temperature for several days. At the end of this period the films were hard and flexible and had good water resistance.

We claim as our invention:

1. A normally solid homopolymer obtained by heating allyl cyclohexanemonocarboxylate in the presence of a peroxide catalyst at a temperature between 65° C. and 300° C.

2. A normally solid homopolymer obtained by heating allyl methylcyclohexanemonocarboxylate in the presence of a peroxide catalyst at a temperature between 65° C. and 300° C.

3. A normally solid homopolymer obtained by heating allyl trimethylcyclohexanemonocarboxylate in the presence of a peroxide catalyst at a temperature between 65° C. and 300° C.

4. A normally solid homopolymer obtained by heating methallyl cyclohexanemonocarboxylate in the presence of a peroxide catalyst at a temperature between 65° C. and 300° C.

5. A normally solid homopolymer obtained by heating an ester of a beta, gamma-ethylenically unsaturated aliphatic monohydric alcohol and cyclohexanemonocarboxylic acid in the presence of a peroxide catalyst at a temperature between 65° C. and 300° C.

6. A normally solid homopolymer obtained by heating in the presence of a peroxide catalyst at a temperature between 65° C. and 300° C. an ester of a monohydric alcohol containing an ethylenic linkage at least two carbon atoms removed from the terminal hydroxyl group, and a saturated aliphatic monocarboxylic acid containing a single ring of six carbon atoms, one carbon atom of which is joined to a hydrogen and to a carboxyl group and the remaining ring carbon atoms are joined to members of the group consisting of hydrogen, chlorine, bromine and straight chain alkyl radicals containing from 1 to 5 carbon atoms.

7. A normally solid copolymer obtained by heating in the presence of a peroxide catalyst at a temperature between 65° C. and 300° C. a mixture containing 99% to 60% by weight of allyl cyclohexanemonocarboxylate and 1% to 40% by weight of diallyl phthalate.

8. A normally solid copolymer obtained by heating in the presence of a peroxide catalyst at a temperature between 65° C. and 300° C. a mixture containing 99% to 60% by weight of allyl cyclohexanemonocarboxylate and 1% to 40% by weight of styrene.

9. A normally solid copolymer obtained by heating in the presence of a peroxide catalyst at a temperature between 65° C. and 300° C. a mixture containing 99% to 30% by weight of allyl cyclohexanemonocarboxylate and 1% to 70% by weight of methyl methacrylate.

10. A normally solid copolymer obtained by heating in the presence of a peroxide catalyst at a temperature between 65° C. and 300° C. a mixture containing (1) an ester of a monohydric alcohol containing an ethylenic linkage at least two carbon atoms removed from the terminal hydroxyl group, and a saturated aliphatic monocarboxylic acid containing a single ring of six carbon atoms, one carbon atom of which is joined to hydrogen and to a carboxyl group and the remaining ring carbon atoms are joined to a member of the group consisting of hydrogen, chlorine, bromine and straight chain alkyl radicals containing from 1 to 5 carbon atoms, and (2) a dissimilar monomer containing at least one $CH_2=C=$ group in its molecule.

11. A normally solid polymer of the group consisting of (1) homopolymers obtained by heating in the presence of a peroxide catalyst and a temperature between 65° C. and 300° C. an ester of a monohydric alcohol containing an ethylenic linkage at least two carbon atoms removed from the terminal hydroxyl group, and a saturated aliphatic monocarboxylic acid containing a single ring of six carbon atoms, one carbon atom of which is joined to hydrogen and to a carboxyl group and the remaining ring carbon atoms are joined to a member of the group consisting of hydrogen, chlorine, bromine and straight chain alkyl radicals containing from 1 to 5 carbon atoms, and (2) copolymers obtained by heating in the presence of a peroxide catalyst and a temperature between 65° C. and 300° C. an ester of ethylenically unsaturated monohydric alcohols and saturated aliphatic monocarboxylic acids as described in (1) above, and a dissimilar monomer containing at least one $CH_2=C=$ group in its molecule.

12. A composition comprising 100 parts of nitrocellulose and 10 parts to 300 parts of polymerized allyl cyclohexanemonocarboxylate obtained by heating allyl cyclohexanemonocarboxylate in the presence of a peroxide catalyst at a temperature between 65° C. and 300° C.

13. A composition comprising 100 parts of nitrocellulose and 10 parts to 300 parts of polymerized allyl methylcyclohexanemonocarboxylate obtained by heating allyl methylcyclohexanemonocarboxylate in the presence of a peroxide catalyst at a temperature between 65° C. and 300° C.

14. A composition comprising 100 parts of nitrocellulose and 10 parts to 300 parts of a polymer obtained by heating in the presence of a peroxide catalyst at a temperature between 65° C. and 300° C. an ester of a monohydric alcohol containing an ethylenic linkage at least two carbon atoms removed from the terminal hydroxyl group, and a saturated aliphatic monocarboxylic acid containing a single ring of six carbon atoms, one carbon atom of which is joined to hydrogen and a carboxyl group and the remaining ring carbon atoms are joined to a member of the group consisting of hydrogen, chlorine, bromine and straight chain alkyl radicals containing from 1 to 5 carbon atoms.

15. A composition comprising 100 parts of a film forming cellulose ester and 10 parts to 300 parts of a polymer obtained by heating in the presence of a peroxide catalyst at a temperature between 65° C. and 300° C. a mixture containing (1) an ester of a monohydric alcohol containing an ethylenic linkage at least two carbon atoms removed from the terminal hydroxyl group, and a saturated aliphatic monocarboxylic acid containing a single ring of six carbon atoms, one carbon atom of which is joined to hydrogen and a carboxyl group and the remaining ring carbon atoms are joined to a member of the group consisting of hydrogen, chlorine, bromine and straight chain alkyl radicals containing from 1 to 5 carbon atoms, and (2) a dissimilar monomer containing at least one $CH_2=C=$ group in its molecule.

16. A composition comprising a film-forming material of the group consisting of cellulose ethers and esters and as a resinous additive therefor a polymer of the group consisting of (1) homopolymers obtained by heating in the presence of a peroxide catalyst and a temperature between 65° C. and 300 C. an ester of a monohydric alcohol containing an ethylenic linkage at least two carbon atoms removed from the terminal hydroxyl group, and a saturated aliphatic monocarboxylic acid containing a single ring of six carbon atoms, one carbon atom of which is joined to hydrogen and to a carboxyl group and the remaining ring carbon atoms are joined to a member of the group consisting of hydrogen, chlorine, bromine and straight chain alkyl radicals containing from 1 to 5 carbon atoms, and (2) copolymers obtained by heating in the presence of a peroxide catalyst and a temperature between 65° C. and 300° C. an ester of the monohydric alcohols and saturated aliphatic monocarboxylic acids which esters are described in (1) above, and a dissimilar monomer containing at least one $CH_2=C=$ group in its molecule.

References Cited in the file of this patent

UNITED STATES PATENTS

| Number | Name | Date |
|---|---|---|
| 2,374,081 | Dean | Apr. 17, 1945 |
| 2,482,606 | Adelson | Sept. 20, 1949 |
| 2,489,103 | Morris | Nov. 22, 1949 |
| 2,578,950 | Scheibli | Dec. 18, 1951 |

OTHER REFERENCES

Arnold et al.: J. Am. Chem. Soc., 64 (December 1942), 2875–2877.